United States Patent [19]

Jo

[11] Patent Number: 5,489,944
[45] Date of Patent: Feb. 6, 1996

[54] ENCODING METHOD AND APPARATUS TO DETERMINE QUANTIZATION LEVELS USING ENERGY CHARACTERISTICS IN THE DCT DOMAIN

[75] Inventor: Jae M. Jo, Seoul, Rep. of Korea

[73] Assignee: Samsung Electronics Co., Ltd., Kyungki, Rep. of Korea

[21] Appl. No.: 227,012

[22] Filed: Apr. 13, 1994

[30] Foreign Application Priority Data

Apr. 13, 1993 [KR] Rep. of Korea ............... 93-6099

[51] Int. Cl.$^6$ ............................................. H04N 7/50
[52] U.S. Cl. ................................. 348/405; 348/419
[58] Field of Search ............................... 348/405, 419; H04N 7/133, 7/50

[56] References Cited

U.S. PATENT DOCUMENTS 5,150,208  9/1992  Otaka ...................... 348/420

*Primary Examiner*—Howard W. Britton
*Attorney, Agent, or Firm*—Sughrue, Mion, Zinn, Macpeak & Seas

[57] ABSTRACT

An encoding method and apparatus uses energy characteristic of discrete cosine transform (DCT) domains for determination of a quantization level. The DCT domain is divided into for sub-domains. The energy characteristic of each macroblock is represented as one among the four domains such as simple, complicated, edge and plain domains. The buffer generates a first quantization level which is varied according to the buffer fullness in units of a slice. The energy characteristic information and the first quantization level of the buffer are used for determination of a second quantization level supplied to a quantizers. The quantizers quantize the transformation coefficient data according to the second quantization level generated in units of the macroblock. Thus, the viewer can feel less quantization error in sight. The encoding apparatus generates a second quantization level by only addition operation of the varied value of the first quantization level which is determined by the energy characteristic information to the first quantization level, thereby providing a quantization level generator capable of being implemented with simple hardware.

14 Claims, 2 Drawing Sheets

ENCODING METHOD AND APPARATUS TO DETERMINE QUANTIZATION LEVELS USING ENERGY CHARACTERISTICS IN THE DCT DOMAIN

BACKGROUND OF THE INVENTION

The present invention relates to an encoding technology of encoding image data to compress an amount of the data, and more particularly, to an encoding method and apparatus in which a quantization level is varied according to an energy characteristic of a spatial frequency domain.

Recently, a system for transmitting and receiving an image signal and an audio signal chiefly uses a method for converting an analog image and audio signal into a digital image and audio signal and encoding the converted digital signal to transmit the encoded signal and store the converted signal in a storage device. The system further uses a method for receiving the transmitted signal or reading out the stored signal to reproduce the received signal by decoding the received signal or the read-out signal, and converting the decoded signal into an analog signal. Such an encoding and decoding system requires technology for compressing a larger amount of transmitted data to maximize a transmission efficiency of the data.

General methods for encoding an image signal which exist are, for example, a transformation encoding method, a differential pulse code modulation method, a vector quantization method and a variable length coding method. The encoding methods remove redundancy data included in digital image signals for use in compression of a total amount of the data.

To perform such an encoding method, a picture is divided into blocks, each of which has a predetermined magnitude, and image data is transformed into a transformation coefficient of a frequency domain by way of predetermined transformation with respect to each block or a difference signal between the blocks. A discrete cosine transform, a Walsh-Hadamard transform, a discrete cosine transform or a discrete sine transform, for example, can be used as data transformation for each of the respective blocks of data. Technologies for properly encoding such transformation coefficients according to the data characteristics, storing or transmitting the encoded signal, and decoding the encoded signal for reproduction have been recognized as very important technologies in a high definition TV (HDTV), a high definition VTR (HD-VTR), a digital camcorder, multimedia equipment, a video phone, etc.

Meanwhile, when an image signal is compressed using a variable length coding and decoding apparatus, a buffer is used for invariably maintaining a transfer bit rate of the encoded and transmitted signal. A quantization level is controlled according to a fullness of the buffer to avoid an overflow or an underflow of the buffer. Accordingly, an amount of the data which is input to the buffer is controlled. A conventional quantization level is chiefly controlled in units of a slice according to the data storage state in the buffer. In such a quantization level determination method, the quantization level is properly controlled according to the buffer fullness when the transfer bit rate of the buffer is determined. Thus, an amount of the bits which are input to the buffer could be exactly controlled. However, there exists a problem that an image characteristic is not considered at all.

Accordingly, many of the systems varied the quantization level in units of a macroblock so that the image characteristic could be reflected. Such a conventional quantization level of a unit macroblock is determined by the characteristic of the image signal in an image domain for processing image pixels. Thus, a signal processing procedure is complicated and hardware implimentation is difficult. Conventional technology using an energy characteristic of a spatial frequency domain to quantize the image signal is disclosed in U.S. Pat. No. 5,109,451.

SUMMARY OF THE INVENTION

Therefore, to solve the above problems, it is an object of the present invention to provide an encoding method having a simpler signal processing procedure than that of an image domain by using a quantization level which is determined in units of a macroblock by extracting a characteristic of an image signal in a frequency domain by means of transformation of the image signal so as to quantize the image signal.

Another object of the present invention is to provide an encoding apparatus which can embody a quantization level determination method which uses an energy characteristic in the above-mentioned frequency domain with simple hardware.

Thus, to accomplish one object of the present invention, there is provided an encoding method which quantizes and encodes image data to transmit the encoded data through a buffer. The encoding method comprises the steps of:

receiving the encoded data to generate a first quantization level which is varied in order to transmit the received data in a predetermined transfer rate; transforming image data of an image domain into image data in block units to thereby generate transformation coefficient data of a frequency domain; dividing a unit block frequency domain into a plurality of frequency sub-domains; generating energy characteristic information according to a ratio of the transformation coefficient data included in the respective frequency sub-domains; determining a second quantization level according to the energy characteristic information and the first quantization level; and quantizing the transformation coefficient data according to the second quantization level.

The other object of the present invention can be accomplished by providing an encoding apparatus which quantizes and encodes image data to transmit the encoded data. The encoding apparatus comprises:

buffer means which receives the encoded data to transmit the received data in a predetermined transfer rate, and generates a first quantization level which is varied so as to maintain the transfer rate invariably; transformation means for transforming image data of an image domain into image data in block units to thereby generate transformation coefficient data of a frequency domain; image characteristic discrimination means for dividing a unit block frequency domain into a plurality of frequency sub-domains and generating energy characteristic information according to a ratio of the transformation coefficient data included in the respective frequency sub-domains; quantization level determination means for receiving the energy characteristic information and the first quantization level and determining a second quantization level according to the energy characteristic information and the first quantization level to generate the determined second quantization level; and means for receiving the transformation coefficient data from the transformation means and quantizing the transformation coefficient data according to the second quantization level.

DETAILED DESCRIPTION OF THE PREFERRED EMBODIMENT

A preferred embodiment of the present invention will be described below in more detail with reference to the accompanying drawings.

Figure 1:
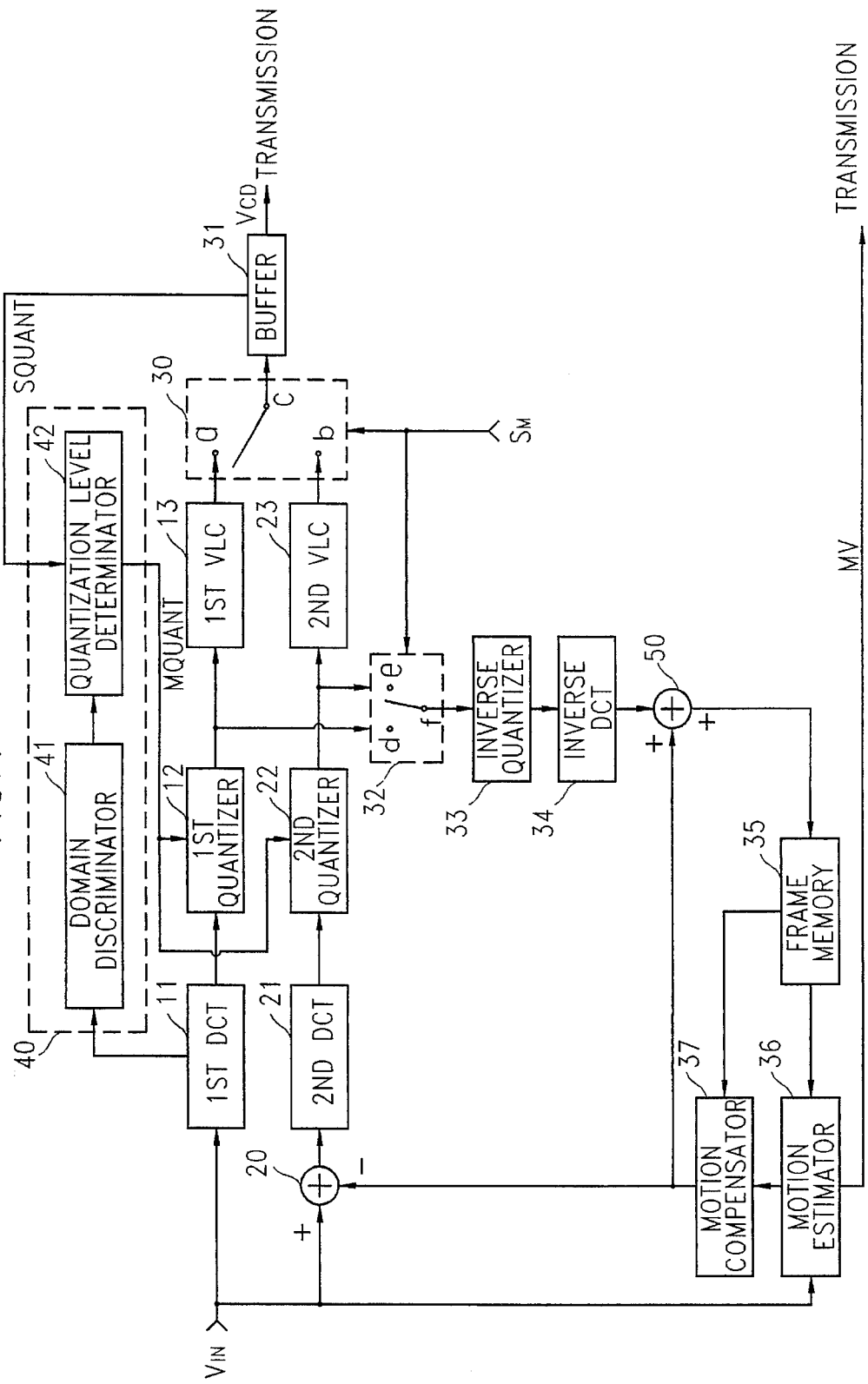
FIG. 1 is a block diagram showing one embodiment of an encoding apparatus which uses a quantization level of a macroblock unit according to the present invention.

FIG. 1 is a block diagram showing one embodiment of an encoding apparatus for encoding an image signal by using a quantization level which is determined through an energy characteristic of a DCT domain according to the present invention.

The FIG. 1 apparatus includes a first DCT portion 11 for transforming the image data which is input through an input port into data on a DCT domain being a frequency domain in units of a block. The output of first DCT portion 11 is connected to a first quantizer 12 for transforming the transformation coefficient data into representive values each of which has a predetermined level. The outpt of first quantizer 12 is connected to a first variable length coder 13 for variable-length encoding the quantized image data according to data distribution probability. DCT portion 12, quantizer 12 and variable-length coder 13 forms an intra-mode for encoding the image data contained in a frame. The intra-mode encodes the image data which is composed of pixel values constituting the image which is not differential data.

The FIG. 1 apparatus includes a first adder 20 which calculates differential data between the image data inputted through an input port and predetermined feedback data. A second DCT portion 24 for transforming the differential data into data of a frequency domain is connected to the output of first adder 20. A second quantizer 22 for transforming transformation coefficients into representative values is connected to the output of second DCT portion 21. A second variable-length coder 23 for variable-length coding the quantized data to compress the data is connected to the output of second quantizer 22. DCT portion 21, quantizer 22 and variable-length coder 23 constitutes an inter mode routine for encoding a difference signal between the current block data and the motion compensated block data.

On the other hand, the FIG. 1 apparatus includes a first switch 30 for selecting one among two contacts "a" and "b" which are connected to the outputs of first and second variable-length coders 13 and 23, respectively, according to a mode selection signal $S_M$. A buffer 31 for outputting a first quantization level SQUANT which is used for maintaining an mount of transmission data $V_{CD}$ invariably is connected to the output of first switch 30. A second switch 32 selects one among two contacts "d" and "e" which are connected to the respective outputs of first and second quantizers 12 and 22 according to mode selection signal $S_M$. An inverse quantizer 33 and inverse DCT portion 34 are subsequently connected to the output of second switch 32. A second adder 50 for adding the inversely transformed data and predetermined feedback data to reconstruct a picture and a frame memory 35 are connected to the output of inverse DCT portion 34. A motion estimator 36 looks for blcok data which is most similar to image data $V_{IN}$ from frame memory 35 and calculates a motion vector MV which represents motion between the blocks. A motion compensator 37 for compensating the output data of frame memory 37 using motion vector MV is connected to the output of motion estimator 36. A whole direction analyzer 40 for outputting quantization level MQUANT in units of a macroblock is also connected to the output of first DCT portion 12. Whole direction analyzer 40 includes a domain discrimination portion 41 which receives the output of first DCT portion 11 and detects energy characteristic information in units of a macroblock, and a quantization level determination portion 42 which generates an optimum quantization level MQUANT using the energy characteristic information and first quantization level SQUANT which is supplied from buffer 31.

Figure 2:
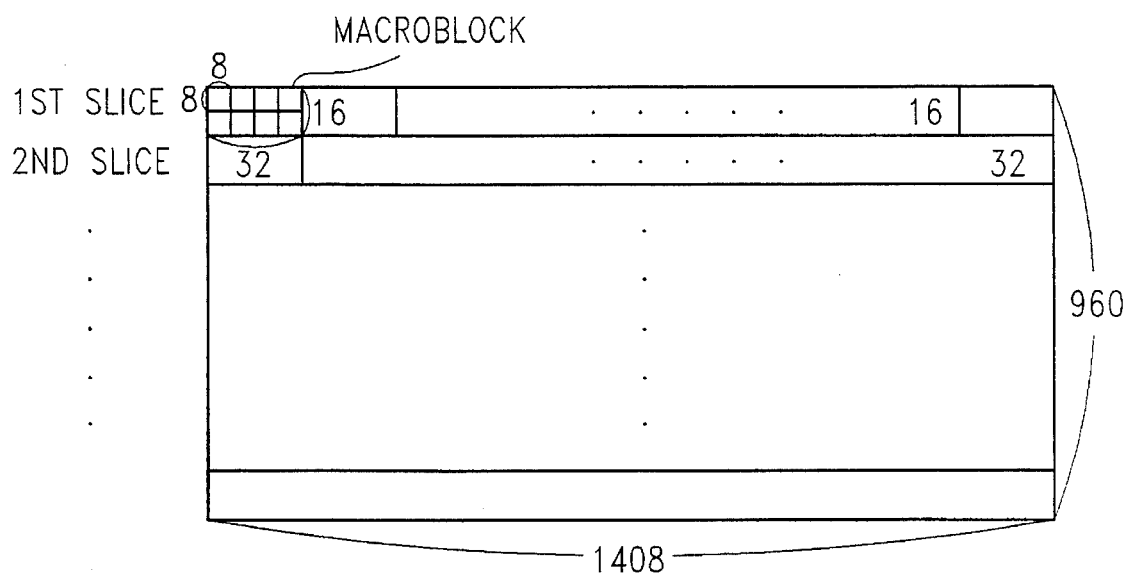
FIG. 2 is a view showing a processing unit of image data according to the present invention.

FIG. 2 is a conceptional view which represents blocks of the data processed in the FIG. 1 apparatus. The FIG. 1 apparatus performs a DCT transformation with respect to the block composed of 8 horizontal pixels by 8 vertical pixels. Also, the FIG. 1 apparatus performs motion estimation and motion compensation in units of a macroblock composed of a plurality of blocks. Generally, the macroblock has a size of 16 by 16, or 32 by 16. In this embodiment, the macroblock of 32 (horizontal) by 16 (vertical) has been used. Also, the quantization level or the quantization step size which is determined by a state of the buffer has been determined in units of 1,408-by-16 slices.

Image data $V_{IN}$ of a unit block which is inputted to the FIG. 1 apparatus is transformed into transformation coefficient data of a frequency domain in first DCT portion 11. Here, the energy of the transformation coefficient data is mainly collected toward a low frequency. First adder 20 subtracts the output data of motion compensator 37 from input image data $V_{IN}$ to calculate differential data. The differential data is transformed into data of a frequency domain in second DCT portion 21. First and second quantizers 12 and 22 transform the transformation coefficient data into the representative values each of which has a predetermined level according to secodn quantization level MQUANT. Quantization level MQUANT which is supplied to first and second quantizers 12 and 22 is calculated in whole direction analyzer 40 considering a human's spatial vision characteristic. If the quantization level is high, an amount of the data outputted from quantizer 12 or 22 becomes little and a quantization error becomes large. To the contrary, if the quantization level is low, an amount of the data outputted from quantizer 12 or 22 becomes much and a quantization error becomes small. Variable-length coders 13 and 23 which receive the quantized DCT transformation coefficient data further compress transmission data $V_{CD}$ by variable-length coding the data using a statistical characteristic of the data.

First switch 30 receives the variable-length coded data which is supplied from first and second variable-length coders 13 and 23 through corresponding contact "a" or "b," and supplies the output data of the variable-length coders corresponding to the contact which is selected by externally supplied mode selection signal $S_M$ to buffer 31. Then, buffer 31 outputs first quantization level SQUANT to maintain an amount of the data outputted from buffer 31 invariably. The whole direction analyzer 40 receives the output of first DCT portion 11 and first quantization level SQUANT and generates second quantization level MQUANT being an optimum quantization level. The quantization level determination process will be described in detail later.

On the other hand, since there are many similar portions between pictures, motion is estimated to calculate motion vector MV in case of the picture having slight movement. Since the difference signal between the adjacent pictures is very small, the data is compensated using motion vector MV to further compress the data. To perform such motion compensation, second switch 32 receives the quantization coefficient data supplied from first and second quantizers 12 and 22 through corresponding contacts "d" or "e" and supplies the quantization coefficients of the corresponding quantizer to inverse quantizer 33 according to mode selection signal $S_M$ which represents the intra-mode or the inter-mode. Inverse quantizer 33 and inverse DCT portion 34 inversely quantize the input quantization coefficients, and inversely transform the inversely quantized data into the image data of the spatial domain. The image data outputted from inverse DCT portion 34 is added to the output data of the motion compensator 37 and the added data is stored in frame memory 35 for reconstructing the picture. If such a process completes with respect to one frame, frame memory 35 stores the same picture as the previously compressed and transmitted picture. This means that the stored picture is same as the picture displayed in a reception end or during reproducing. If a next picture is inputted, motion estimator 36 looks for the block data of the pattern most similar to the input image data from frmae memory 35, and calculates motion vector MV which represents the movement between the two blocks. Such a motion vector MV is transmitted to the reception end for decoding, and is also transmitted to motion compensator 37. Motion compensator 37 reads out the block data corresponding to motion vector MV from the frame data in frame memory 35 and supplies the read block data to first adder 20. Then, first adder 20 calculates the differential data between input image data $V_{IN}$ and the block data outputted from motion compensator 37. The difference data is again encoded and transmitted to the reception end.

Figure 3:
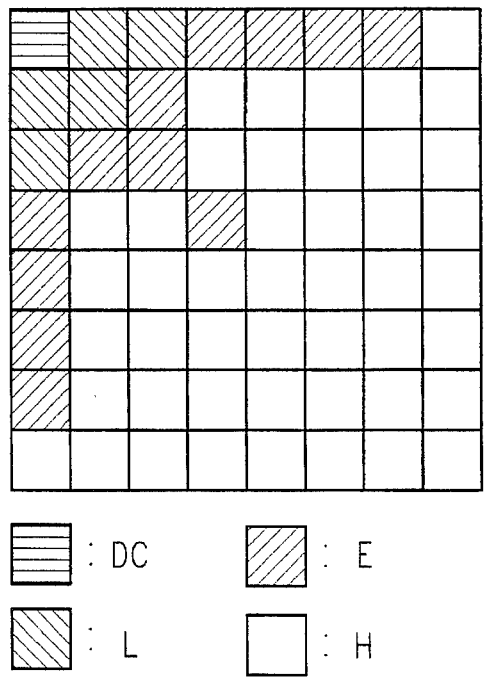
FIG. 3 is a view showing a discrete cosine transform (DCT) domain having four sub-domains according to the present invention.

FIG. 3 shows the frequency sub-domains in the frequency domain which is obtained by a discrete cosine transform. As shown in FIG. 3, the DCT domain of the block size is divided into four sub-domains according to the frequency components. Generally, in the DCT domain, the upperleft portion corresponds to the DC components. As it goes to the lowerright portions, the portion has the higher frequency components. That is, as it goes to the lower frequency portions, the energy becomes larger. In FIG. 3, the most upperleft portion is called a "DC domain," and the low frequency portion is called an "L domain." The edge portion located in the following position of the "L domain" is called an "E domain," and the other high frequency portion is called an "H domain."

For determination of second quantization level MQUANT, the image is classified into four domains such as a simple domain, a complicated domain, and an edge domain and a plain domain which is not included in the above three kinds of domains, in units of the macroblock. The reason is that since the simple domain and the edge domain are recognized as large in sight compared with the domain of which the boundary lines between the blocks are complicated, the quantization error is reduced in the simple domain and the edge domain and increased in the complicated domain, to thereby equalize the feeling of sight with respect to the quantization error in total to make the viewer feel the quality of picture as if the quality of picture were improved.

Taking into consideration such an image characteristic, the domain determination process of the macroblock will be described below. The data in the frequency domain outputted from first DCT portion 11 is supplied to domain discrimination portion 41 of whole direction analyzer 40. Domain discrimination portion 41 divides one block of the DCT domain into the four frequency sub-domains as shown in FIG. 3. Domain discrimination portion 41 sums up the absolute values of the transformation coefficient data according to the respective one of the four sub-domains (DC, L, E and H), in units of a block accumulates the summed values of the eight blocks constituting a unit macroblock according to the respective-domains and obtains four sub-domain average values by respectively averaging the accumulated results corresponding to the respective sub-domains. Domain discrimination portion 41 determines the domain of the macroblock by using the four sub-domain average values of the macroblock and the requirements shown in the following Table I.

TABLE I

| PREREQUISITE | REQUIREMENTS | DOMAIN |
| --- | --- | --- |
| A < AVG(DC) < B | AVG(E) + AVG(H) < C AND AVG(L) > D | SIMPLE |
| | AVG(L) + AVG(E) > k × AVG(H) | EDGE |
| | AVG(L) + AVG(E) < k × AVG(H) | COMPLICATED |
| THE ABOVE CONDITIONS ARE NOT APPLICABLE | | PLAIN |

Here, A, B, C, D and k are constant, and have values of 35, 180, 100, 10 and 3, respectively in the result of simulation. The "AVG( )" represents a sub-domain average value of the sub-domain corresponding to the character in the parenthesis. Thus, all the macroblocks have the energy characteristic information which is represented as one among the four domains in Table I.

Quantization level determination portion 42 recieves the energy characteristic information of the current macroblock which is supplied from domain discrimination portion 41, and first quantization level SQUANT of the unit slice fedback from buffer 31, to determine second quantization level MQUANT of the unit macroblock. The determination method of second quantization level MQUANT is shown in following Table II.

As described aboe, second quantization level MQUANT is varied, the quantization error is reduced in the simple domain and the edge domain, while the quentization error is made to be large in the complicated domain. Accordingly, the quality-improved image can be entirely viewed by the user. First and second quantizers 12 and 22 quantize the block transformation coefficient data supplied from corresponding first and second DCT

TABLE II

| DOMAIN INFORMATION | MQUANT | EFFECT |
| --- | --- | --- |
| SIMPLE DOMAIN | SQUANT – SQUANT/2 | PICTURE QUALITY UP, DATA AMOUNT UP |
| EDGE DOMAIN | SQUANT – SQUANT/4 | PICTURE QUALITY UP, DATA AMOUNT UP |

TABLE II-continued

| DOMAIN INFORMATION | MQUANT | EFFECT |
|---|---|---|
| COMPLICATED DOMAIN | SQUANT + SQUANT/4 | PICTURE QUALITY DOWN, DATA AMOUNT DOWN | portions 11 and 21 according to first quantization level MQUANT supplied from whole direction analyzer 40.

As described above, the present invention relates to an encoding method and apparatus in which the energy characteristic of the DCT portion is used in the quantization operation. Differently from the prior art method which determines the quantization level of the unit macroblock through the complicated processes in the image signal domain, the unit macroblock quantization level is simply determined using the energy characteristic in the DCT domain, to thereby facilitate hardware implementation.

What is claimed is:

1. An encoding apparatus which quantizes and encodes image data to transmit the encoded data, said encoding apparatus comprising:

buffer means which receives the encoded data to transmit the received encoded data in a predetermined transfer rate, and generates a first quantization level which is varied so as to maintain the transfer rate invariably;

transformation means for transforming image data of an image domain into image data of a frequency domain in block units to thereby generate transformation coefficient data of the frequency domain;

image characteristic discrimination means for dividing a unit block frequency domain into a plurality of frequency sub-domains and generating energy characteristic information according to a ratio of the transformation coefficient data included in the respective frequency sub-domains;

quantization level determination means for receiving the energy characteristic information and the first quantization level and determining a second quantization level according to the energy characteristic information and the first quantization level to generate the determined second quantization level; and means for receiving the transformation coefficient data from the transformation means and quantizing the transformation coefficient data according to the second quantization level.

2. An encoding apparatus according to claim 1, wherein said image characteristic discrimination portion sums up absolute values of the transformation coefficient data with respect to the respective sub-domains, calculates a plurality of sub-domain average values by averaging the summed values with respect to the respective sub-domains according to a macroblock composed of a plurality of said block units, and generates energy characteristic information with respect to the macroblock according to the relationship between the plurality of sub-domain average values corresponding to the respective frequency sub-domains.

3. An encoding apparatus according to claim 2, wherein said energy characteristic information is determined as one among a simple domain, an edge domain, a complicated domain and a plain domain according to the following relationship between the sub-domain average values corresponding to the four frequency sub-domains:

Under the condition of A<AVG(DC)<B,
  i) if AVG(E)+AVG(H)<C and AVG(L)>D, it is defined as a "simple domain";
  ii) if AVG(L)+AVG(E)>kAVG(H) and it is not the case of i), it is defined as an "edge domain";
  iii) if AVG(L)+AVG(E)<kAVG(H), and it is not one of the cases of i) and ii), it is defined as a "complicated domain"; and
  iv) if it is neither of i), ii) and iii), it is defined as a "plain domain,"

wherein reference characters A, B, C, D and k are preset constants, and AVG(E), AVG(H) and AVG(L) represent an edge average value, a high frequency domain average value and a low frequency domain average value, respectively.

4. An encoding apparatus according to claim 3, wherein said quantization level determinations means receives said first quantization level and said energy characteristic information, and generates said second quantization level of which the level is reduced if said energy characteristic information represents the simple domain or the edge domain while said quantization level determination means generates said second quantization level of which the level is increased if said energy characteristic information represents the complicated domain.

5. An encoding apparatus according to claim 4, wherein said second quantization level (MQUANT) is as follows:

if said energy characteristic information is the simple domain information, MQUANT=SQUANT−SQUANT/2;

if said energy characteristic information is the edge domain information, MQUANT=SQUANT−SQUANT/4; and if said energy characteristic information is the complicated domain information, MQUANT=SQUANT+SQUANT/4.

6. An encoding apparatus according to claim 5, wherein said first quantization level is determined in units of a slice.

7. An encoding method which quantizes and encodes image data to transmit the encoded data through a buffer, the encoding method comprising the step of:

receiving the encoded data to generate a first quantization level which is varied in order to transmit the received data in a predetermined transfer rate;

transforming image data of an image domain into image data of a frequency domain in block units to thereby generate transformation coefficient data of the frequency domain;

dividing a unit block frequency domain into a plurality of frequency sub-domains;

generating energy characteristic information according to a ratio of the transformation coefficient data included in the respective frequency sub-domains;

determining a second quantization level according to the energy characteristic information and the first quantization level; and quantizing the transformation coefficient data according to the second quantization level.

8. An encoding method according to claim 7, wherein said domain discrimination step discriminates the frequency domain into a plurality of frequency sub-domains which are discriminated from one another according to the frequency components of the frequency domain.

9. An encoding method according to claim 8, wherein said energy characteristic information generating step comprises the steps of:

receiving the transformation coefficient data and summing up the absolute values of the transformation coefficient data with respect to the respective frequency sub-domains;

calculating sub-domain average values by averaging the summed value with respect to the respective frequency sub-domain according to a macroblock composed of a plurality of said block units; and determining the energy characteristic information with respect to the macroblock according to the relationship between the sub-domain average values corresponding to the respective frequency sub-domains.

10. An encoding method according to claim 9, wherein said energy characteristic information is determined as one among a simple domain, an edge domain, a complicated domain and a plain domain according to the following relationship between the sub-domain average values corresponding to the four frequency sub-domains:

under the condition of A<AVG(DC)<B,
i) if AVG(E)+AVG(H)<C and AVG(L)>D, it is defined as a "simple domain";
ii) if AVG(L)+AVG(E)>kAVG(H) and it is not the case of i), it is defined as an "edge doomain";
iii) if AVG(L)+AVG(E)<kAVG(H), and it is not one of the cases of i) and ii), it is defined as a "complicated domain"; and
iv) if it is neither of i), ii) and iii), it is defined as a "plain domain,"

wherein reference characters A, B, C, D and k are preset constants, and AVG(E), AVG(H) and AVG(L) represent an edge average value, a high frequency domain average value and a low frequency domain average value, respectively.

11. An encoding method according to claim 10, wherein said second quantization level determination step reduces said second quantization level if said energy characteristic information represents the simple domain or the edge domain while said quantization level determination step increases said second quantization level if said energy characteristic information represents the complicated domain.

12. An encoding method according to claim 11, wherein said second quantization level (MQUANT) is determined as MQUANT= SQUANT–SQUANT/2 if said energy characteristic information is the simple domain information with respect to said first quantization level (SQUANT) which is determined in units of a slice.

13. An encoding method according to claim 11, wherein said second quantization level (MQUANT) is determined as MQUANT=SQUANT–SQUANT/4 if said energy characteristic information is the edge domain information with respect to said first quantization level (SQUANT) which is determined in units of a slice.

14. An encoding method according to claim 11, wherein said second quantization level (MQUANT) is determined as MQUANT=SQUANT+SQUANT/4 if said energy characteristic information is the complicated domain information with respect to said first quantization level (SQUANT) which is determined in units of a slice.

* * * * *